(12) United States Patent
Pletersek et al.

(10) Patent No.: US 7,777,661 B2
(45) Date of Patent: Aug. 17, 2010

(54) INTERPOLATION METHOD AND A CIRCUIT FOR CARRYING OUT SAID METHOD USED IN A HIGH-RESOLUTION ENCODER

(75) Inventors: Anton Pletersek, Na Klancu (SI); Roman Benkovic, Krzisnikova (SI)

(73) Assignee: IDS d.o.o., Ljubljana (SI)

( * ) Notice: Subject to any disclaimer, the term of this patent is extended or adjusted under 35 U.S.C. 154(b) by 0 days.

(21) Appl. No.: 12/311,655

(22) PCT Filed: Mar. 28, 2007

(86) PCT No.: PCT/SI2007/000017

§ 371 (c)(1),
(2), (4) Date: Apr. 8, 2009

(87) PCT Pub. No.: WO2008/045005

PCT Pub. Date: Apr. 17, 2008

(65) Prior Publication Data

US 2010/0019942 A1    Jan. 28, 2010

(30) Foreign Application Priority Data

Oct. 11, 2006    (SI) .................................. 200600238

(51) Int. Cl.
*H03M 1/34* (2006.01)
(52) U.S. Cl. ........................ 341/158; 341/156; 341/159
(58) Field of Classification Search .......... 341/158–159
See application file for complete search history.

(56) References Cited

U.S. PATENT DOCUMENTS

| 3,675,238 A | 7/1972 | Butscher | |
| 4,831,379 A * | 5/1989 | van de Plassche | 341/156 |
| 5,805,096 A * | 9/1998 | Morisson et al. | 341/155 |
| 7,394,420 B2 * | 7/2008 | Landolt | 341/158 |

FOREIGN PATENT DOCUMENTS

DE    1945206 A1    4/1971

(Continued)

*Primary Examiner*—Khai M Nguyen
(74) *Attorney, Agent, or Firm*—Jacobson Holman PLLC

(57) ABSTRACT

Intermediate digital signals $F_i(\alpha)$, $G_i(\alpha)$, $i=1, \ldots I$, are generated, which result from a comparison of reference potentials of the first input analogue signal at a shifted value of its observed argument and with a suitably reduced amplitude to the potential, which is inverse to said potential, of the third input analogue signal at the same shifted value of the observed argument and with the amplitude reduced in said way, the shifted argument values being uniformly distributed within the first half-period. A value U of the voltage is measured at any value of the observed argument as at that time the highest one of the voltages at terminals with said reference potentials. An actual peak amplitude A of the input analogue signals is determined as $A = k_{I,m} U$ where the factor $k_{I,m}$ is a quotient of the peak amplitude of said input analogue signals and of the mean value of the voltage waveform envelope of the reference potentials pertaining to said peak amplitude.

Figure 1:
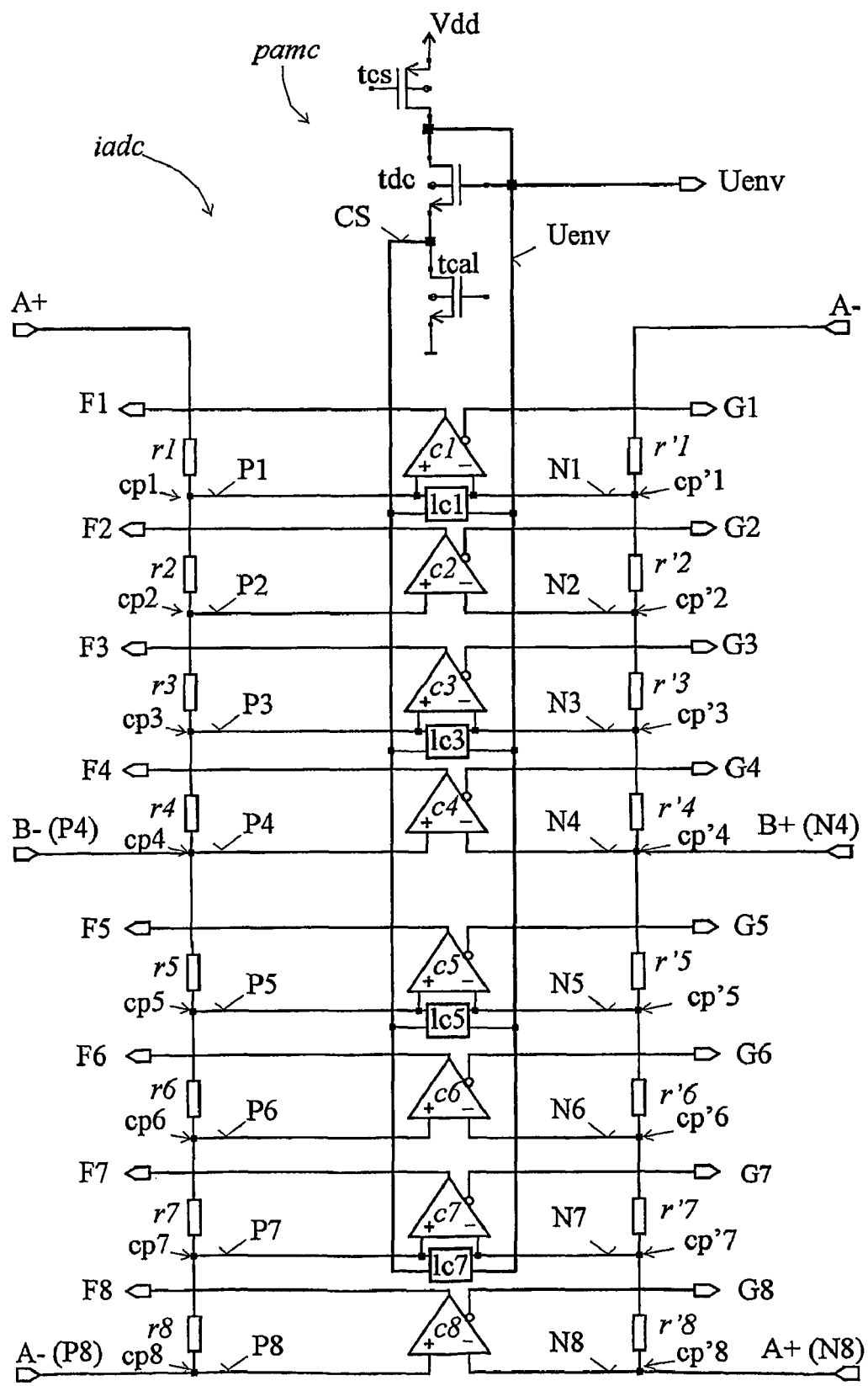

When the proposed method is used to automatically control the gain, said voltage U is conducted directly to the input of an automatic gain control circuit, whereat the input voltage of this circuit is set to the mean value of the voltage waveform envelope of the reference potentials.

12 Claims, 2 Drawing Sheets

FOREIGN PATENT DOCUMENTS

| | | |
|---|---|---|
| DE | 10301848 A1 | 7/2004 |
| JP | 63012915 A | 1/1988 |
| SI | 215771 A | 2/2005 |
| SI | 22403 A | 4/2008 |
| WO | WO 2008036053 A1 | 3/2008 |

\* cited by examiner

INTERPOLATION METHOD AND A CIRCUIT FOR CARRYING OUT SAID METHOD USED IN A HIGH-RESOLUTION ENCODER

This is a national stage of PCT/SI07/000017 filed Mar. 28, 2007 and published in English, which has a priority of Slovenia no. P-200600238 filed Oct. 11, 2006, hereby incorporated by reference.

The invention relates to an improved interpolation method to be carried out in a high-resolution encoder with the input states of said method being defined by four signals each time mutually in quadrature and with generation of intermediate digital signals, which result from a comparison of the potential of the first input analogue signal at each time another shifted value of its observed argument to the potential, which is inverse to said potential, at the same and each time another shifted value of the observed argument, whereat the improved method makes it possible to determine the amplitude of the input analogue signal with an error of a few percent by measuring just one single voltage. The invention also relates to an improved interpolation circuit for carrying out said improved method.

An interpolation method and an interpolation circuit, which are provided for a high-resolution encoder designed for measuring fast displacements, are disclosed in SI patent 21577.

Said interpolation method uses input states defined by four input analogue signals, which are each time mutually in quadrature. The functional dependence of the first input analogue signal on the observed argument is sin α. I intermediate digital signals—I being the interpolation number—and I inverted intermediate digital signals are generated at an interpolation step so that each intermediate digital signal results from a comparison of the potential of the first input analogue signal at a shifted value of its observed argument and with the amplitude reduced according to the resistance ratio, to the potential, which is inverse to said potential, of the third input analogue signal at the same shifted value of the observed argument and with the amplitude reduced according to the resistance ratio. The shifted values are uniformly distributed within the first half-period of the observed argument. In a next step the intermediate digital signals are logically combined in a way that a first output digital signal and a second output digital signal in quadrature thereto are generated. The separation time between their slopes can be only a few nanoseconds long, therefore a high slope resolution is made possible.

Said interpolation circuit comprises an interpolation analogue-to-digital flash converter, in which said intermediate digital signals and inverted intermediate digital signals are generated and which comprises a first resistor chain of I resistors connected in series to each other and a similar second resistor chain. Two resistors equally situated in the first and second chain have the same resistance. The first input analogue signal is conducted to a first terminal of the first resistor at the beginning of the first chain and the third input analogue signal is conducted to a second terminal of the I-th resistor at the end of the first chain and the third input analogue signal is conducted to a first terminal of the first resistor at the beginning of the second chain and the first input analogue signal is conducted to a second terminal of the I-th resistor at the end of the second chain and the fourth input analogue signal is conducted to a second terminal of the $\frac{I}{2}$-th resistor in the first chain and the second input analogue signal is conducted to a second terminal of the $\frac{I}{2}$-th resistor in the second chain. Inputs of an i-th comparator, from whose outputs the i-th intermediate digital signal and the i-th inverted intermediate digital signal are taped, are connected to a second terminal of the i-th resistor in the respective first and second chain. Hence the i-th intermediate digital signal results from a comparison of the potential of the first input analogue signal at a shifted value of its observed argument within the first half-period and with the amplitude reduced according to the resistance ratio of the resistors, to the potential, which is inverse to said potential, of the third input analogue signal at the same shifted value of the observed argument at the same shifted value of the observed argument and with the amplitude reduced according to the resistance ratio of the resistors. Said resistances are specified so that the values of the argument shifts are uniformly distributed within the first half-period of the observed argument.

The described method and circuit render possible a simultaneous flash conversion to the intermediate digital signals by means of the varying reference potentials generated to this purpose in a simple way. The resolution and the rate are superior to those of the interpolation as known by then.

Since the compared reference potentials for the flash analogue-to-digital conversion are generated in a simple manner just by means of the resistors in both resistor chains and without any active elements, the conversion is monotonous and steady, the differential nonlinearity at higher frequencies, however, arises just due to the delays in the comparators. Amplitude and phase deviations, also as a consequence of differences in the resistors in both resistor chains and in said comparators, affect only the integral nonlinearity.

Each intermediate digital signal is generated by a corresponding comparator. All comparators operate in the same operating mode during the whole period of the input signals. All switch points of the comparators are situated where the difference between the input reference potential and the inverted input reference potential equals zero. Thus, any in-phase voltages at the inputs of said comparators, which would influence their nonideal operation, do not influence the accuracy of the measured position. Therefore, no analogue reference signal is needed in the described interpolation analogue-to-digital converter and it cannot influence the conversion quality. Hence, there are no missing codes. The conversion carried out on floating differential input signals is monotonous and steady. This renders possible the differential non-linearity to be below 0.05 LSB, i.e. 0.05 of the step in the analogue-to-digital conversion. The appropriate value of the interpolation number I ranges from 2 to roughly 200, whereat the upper limit is limited by a foreseen surface area of the interpolation circuit or by its price.

The accuracy of the analogue-to-digital conversion is not very sensitive to non-ideal features of the input signals so that the described solution does not really need any complex matching of sensor signals.

Nevertheless, the peak amplitudes of two analogue signals output from sensors automatically match each other (automatic matching control). The technical solution is disclosed in SI patent application 2006 00218.

Also the amplification of said two analogue signals is desired to be automatically set (automatic gain control) in order to calibrate the whole encoder, in which exciting devices like light-emitting diodes, magnets or similar, a graduated scale, a scanning reticle, sensors and circuits pertaining thereto are comprised.

Just the difficulties at carrying out the known automatic gain control for two out-phased sinus signals (JP patent 63012915), according to which control the input signals are squared and the squares are added up, i.e. there are needed multipliers—their linearity causes difficulties because of the process dependence—and adders, whereat the multiplier and the adder are complex circuits, and it is also difficult to ensure a sufficient amplitude range, draw the attention to the fact that it is worth improving said method and circuit disclosed in SI patent 21577 in a way that said reference potentials being their inherent feature get exploited to simplify the automatic gain control.

The invention solves the technical problem how to improve the described interpolation method and the circuit for carrying out said method so that it will be possible to determine the peak amplitude of the input signals any instant by means of just a single measured voltage.

Said technical problem is solved by the interpolation method of the invention as characterized by the features of the characterizing portion of the first claim and by the interpolation circuit of the invention as characterized by the features of the characterizing portion of the eighth claim, the variants of the embodiments being characterized by dependent claims.

The improvement according to the invention of the interpolation method and circuit distinguishes itself by the fact that the automatic gain control in a measuring device can be carried out by measuring only the voltage of the upper waveform envelope of the reference potentials, which are generated in the step of the analogue-to-digital conversion of the input analogue signals, whereat the voltage of the upper waveform envelope is present also when the displacing of the sensors with regard to graduated scale is stopped. No complex multiplying or adding circuits are needed to determine the actual peak amplitude of the input analogue signals.

Figure 2:
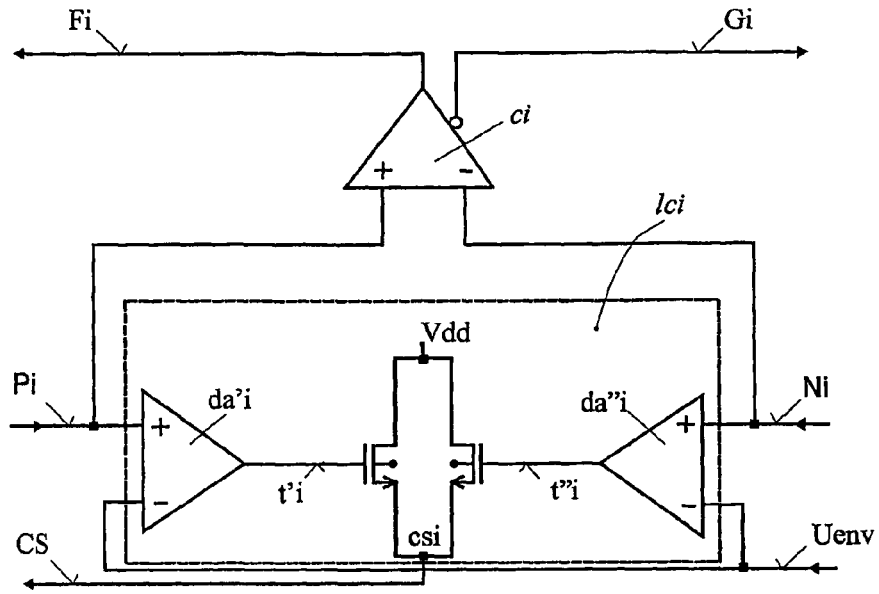
Figure 3:
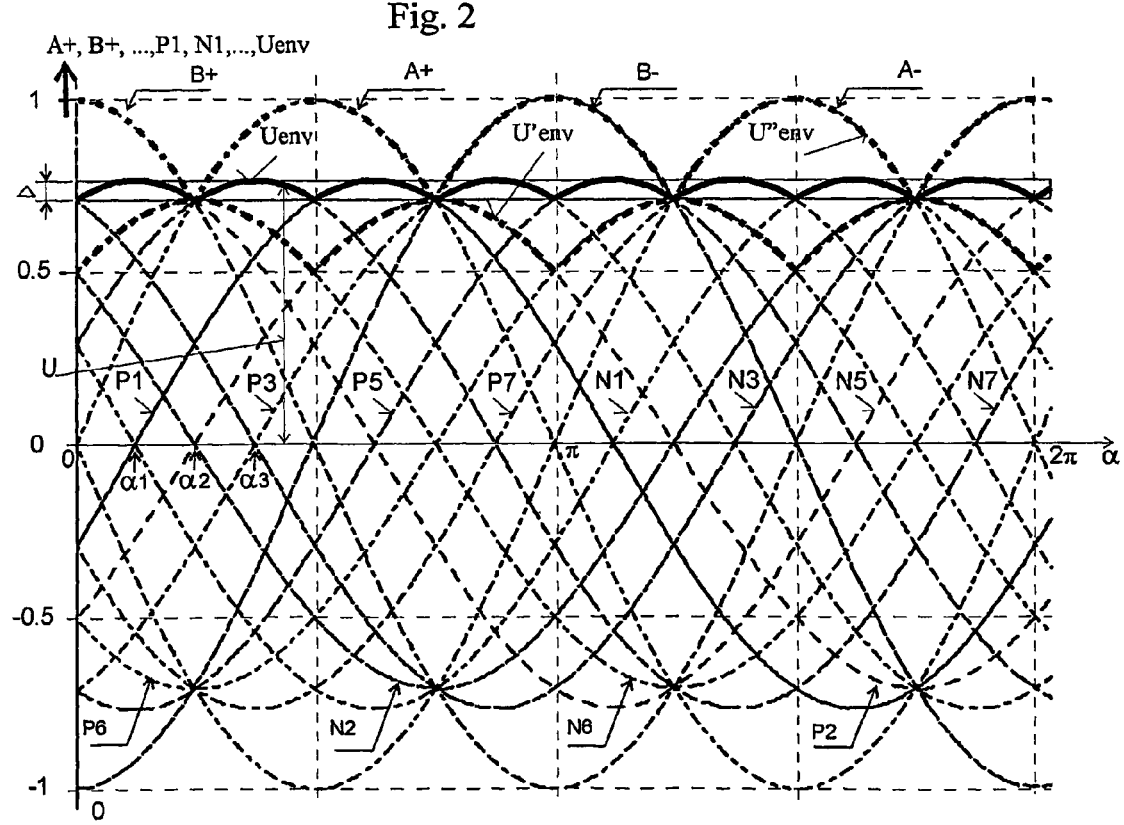

The invention will now be explained in more detail by way of the description of embodiments of the interpolation method and the interpolation circuit and of their variants and with reference to the accompanying drawing representing in:

FIG. 1 the interpolation analogue-to-digital converter as improved by the invention in a preferred variant with an interpolation number of I=8, FIG. 2 the i-th comparator and the i-th local circuit of the invention for the interpolation analogue-to-digital converter as improved by the invention, FIG. 3 the dependence of all compared reference potentials on the observed argument α with the interpolation number of I=8.

The invention relates to an improvement of the interpolation method provided for a high-resolution encoder. States of this method at the input side are defined by signals being each time mutually in quadrature: a first input analogue signal A+(α), a second input analogue signal B+(α), a third input analogue signal A−(α) and a fourth input analogue signal B−(α). The functional dependence of the first input analogue signal A+(α) on the observed argument α is sin α. FIGS. 1 and 3 relate to the interpolation method with the interpolation number of I=8.

In an interpolation step intermediate digital signals Fi(α) and inverted intermediate digital signals Gi(α) for each integer i in the range from 1 to I are generated in that each intermediate digital signal Fi(α) results from a comparison of a potential Pi(α) of the first input analogue signal A+(α) at the value α+αi of its observed argument α within a first half-period and with an amplitude as determined according to a ratio of resistances in a first resistor chain (cf. below) to a potential Ni(α) of the third input analogue signal A−(α) at the same value α+αi of the observed argument α and with an amplitude as determined according to a ratio of resistances in a second resistor chain. The values αi of the shift of the observed argument α are chosen so that they are uniformly distributed within the first half-period of the observed argument α and that the potential P(I/2)(α) is equal to the signal B−(α), the potential P(I)(α) is equal to the signal A−(α), the potential N(I/2)(α) is equal to the signal B+(α) and the potential N(I)(α) is equal to the signal A+(α) (SI patent 21577).

The result of the interpolation method are a first output digital signal and a second output digital signal being in quadrature to the first output digital signal. Said output signals are generated by logically combining the intermediate digital signals Fi(α) and Gi(α).

The invention improves the presented interpolation method by means of the following two steps.

In the first step, a value U of the voltage is measured at any value of the observed argument α, i.e. whenever it is necessary, as the value of the voltage being at that time the highest one of the voltages at the terminals with the potentials Pi(α) and Ni(α), which belong to a family (I,m) of the potentials with values of the index i=m,I/2−m,I/2+m,I−m, m being equal to zero or a positive integer. The locus of such highest voltages is an envelope $U_{env}(\alpha)$ of the potentials Pi(α) and Ni(α) from the family (I,1) of the potentials if m=1, or an envelope $U'_{env}(\alpha)$ of the potentials Pi(α) and Ni(α) from the family (I,2) of the potentials if m=2, or an envelope $U''_{env}(\alpha)$ of the potentials Pi(α) and Ni(α) from the family (I,3) of the potentials if m=3 (FIG. 3, the interpolation number of I=8).

In the second step, an actual peak amplitude A of the input analogue signals A+(α), B+(α), A−(α) and B−(α) is determined as $$A = k_{I,m} U,$$

where the factor $k_{I,m}$ is determined as $$k_{I,m} = \frac{A_o}{\frac{U_{env}^{max} + U_{env}^{min}}{2}}.$$

Here $U_{env}^{max}$ and $U_{env}^{min}$ are previously determined highest and lowest values, respectively, of the voltage $U_{env}(\alpha)$ of the waveform envelope of the potentials Pi(α) and Ni(α) from said selected family (I,m) of the potentials at the known value $A_o$ of the peak amplitude of said input analogue signals.

The voltage interval $\Delta = U_{env}^{max} - U_{env}^{min}$, in which the voltage $U_{env}(\alpha)$ of the waveform envelope of the potentials Pi(α) and Ni(α) from said selected family (I,1) of the potentials undulates, is narrow (FIG. 3). A low waviness of the voltage $U_{env}(\alpha)$ of the waveform envelope is that inherent feature of the known method, which according to the invention is exploited to improve the interpolation method. Said voltage value U measured any instant of time always falls in this narrow interval Δ and the actual peak amplitude A of the input analogue signals is for the factor $k_{I,m}$ above the voltage values falling within this narrow interval Δ. This feature is exploited for a simplified automatic gain control in the encoder.

The factor $k_{I,m}$ is determined in one of the following three ways.

The highest value $U_{env}^{max}$ and the lowest value $U_{env}^{min}$ of the voltage $U_{env}(\alpha)$ of the waveform envelope of the potentials Pi(α) and Ni(α) from the selected family (I,m) of the potentials at the known value $A_o$ of the peak amplitude of said input analogue signals may be calculated and the factor $k_{I,m}$ is calculated. Or there are previously measured the highest value U $U_{env}^{max}$ and the lowest value $U_{env}^{min}$ of the voltage $U_{env}(\alpha)$ of the waveform envelope of the potentials $Pi(\alpha)$ and $Ni(\alpha)$ from said selected family (I,m) of the potentials at the known value $A_o$ of the peak amplitude of said input analogue signals and the factor $k_{I,m}$ is calculated. Or, on the other hand, there is previously measured a value $U_p$ of the voltage $U_{env}(\alpha)$ of the waveform envelope of the potentials $Pi(\alpha)$ and $Ni(\alpha)$ from said selected family (I,m) of the potentials at some value of the observed argument $\alpha$ at the known value $A_o$ of the peak amplitude of said input analogue signals and the factor $$k_{I,m} = \frac{A_o}{Up}$$

is calculated.

The potentials $Pi(\alpha)$ and $Ni(\alpha)$ from that potential family (I,m) with the waveform envelope with the voltage $U_{env}(\alpha)$, which has the lowest waviness $$\frac{\Delta}{U_{env}^{max}},$$

are selected to measure the instantaneously highest voltage value U. At the selected interpolation number I this is the potential family (I,1). It is the supposition of the invention that the value U is situated on the waveform envelope $U_{env}(\alpha)$, the amplitude of the waves, however, is so low that it can be presumed that a certain intermediate value between the two extremes of the waveform envelope $U_{env}(\alpha)$ was measured with a certain error and the actual peak amplitude A of the input analogue signals is calculated from said intermediate value by means of the known factor $k_{I,m}$.

The behaviour of the voltage $U_{env}(\alpha)$ of the waveform envelope of the reference potentials $Pi(\alpha)$ and $Ni(\alpha)$ from said selected family (8,1) of the potentials with the interpolation number I=8 and the index m=1, i.e. of the reference potentials P1, P3, P5, P7, N1, N3, N5, N7, at the known value $A_o$ of the peak amplitude of said input analogue signals is represented by the following functional relation:

$$U_{env}(\alpha) = A_o [\sin(\alpha (\bmod \frac{\pi}{4})) \cdot (1 - \sin \frac{\pi}{4}) + \cos(\alpha (\bmod \frac{\pi}{4})) \cdot \sin \frac{\pi}{4}].$$

The highest value and the lowest value attained by the voltage $U_{env}(\alpha)$ of the waveform envelope are herefrom:

$U_{env}^{max} = 0.76536 A_o$ and $U_{env}^{min} = 0.70711 A_o$.

Hence the calculated value of said factor is equal to $$k_{8,1} = \frac{A_o}{\frac{U_{env}^{max} + U_{env}^{min}}{2}} = 1,3583$$

and the actual peak amplitude A of the input analogue signals is then determined by means of the instantaneously highest measured voltage U as A=1.3583.U. The actual peak amplitude A is determined with the relative accuracy of ±0.029.

When the proposed method is used to automatically control the gain, said voltage U is conducted directly to the input of an automatic gain control circuit, whereat the input voltage of this circuit is already set to $$\frac{U_{env}^{max} + U_{env}^{min}}{2} \left( 1 \pm \frac{1}{2} \frac{\Delta}{A_o} \right).$$

The invention also relates to an improvement of the interpolation circuit provided for a high-resolution encoder.

The first output digital signal and the second output digital signal in quadrature thereto are prepared by logically combining the intermediate digital signals $Fi(\alpha)$ and the inverted intermediate digital signals $Gi(\alpha)$, i=1, ... I, which are generated in an interpolation analogue-to-digital converter. FIG. 1 actually represents the already improved interpolation analogue-to-digital converter iadc with the interpolation number of I=8.

The interpolation analogue-to-digital converter iadc comprises a first resistor chain of a first resistor r1, a second resistor r2 and so on up to an I-th resistor rI, which are series-connected to each other, and a second resistor chain of a first (dash) resistor r'1, a second (dash) resistor r'2 and so on up to an I-th (dash) resistor r'I, which are series-connected to each other. The two first resistors r1 and r'1 and the two second resistors r2 and r'2 and so on up to the two I-th resistors rI and r'I, each time equally situated in the respective first and second resistor chain, have the same resistance.

The first input analogue signal $A+(\alpha)$ is conducted to a first terminal of the first resistor r1 at the beginning of the first resistor chain and the third input analogue signal $A-(\alpha)$ is conducted to a second terminal of the I-th resistor rI at the end of the first resistor chain and the third input analogue signal $A-(\alpha)$ is conducted to a first terminal of the first resistor r'1 at the beginning of the second resistor chain and the first input analogue signal $A+(\alpha)$ is conducted to a second terminal of the I-th resistor r'I at the end of the second resistor chain and the fourth input analogue signal $B-(\alpha)$ is conducted to a second terminal of the $$\frac{I}{2}\text{-th}$$

resistor $$r\frac{I}{2}$$

in the first resistor chain and the second input analogue signal $B+(\alpha)$ is conducted to a second terminal of the $$\frac{I}{2}\text{-th}$$

resistor $$r'\frac{I}{2}$$

in the second resistor chain. The first input analogue signal $A+(\alpha)$, the second input analogue signal $B+(\alpha)$, the third input analogue signal $A-(\alpha)$ and the fourth input analogue signal $B-(\alpha)$ are each time mutually in quadrature. The functional dependence of the first input analogue signal $A+(\alpha)$ on the observed argument $\alpha$ is sin $\alpha$.

The inputs of a first comparator c1, from whose outputs the first intermediate digital signal $F1(\alpha)$ and the first inverted intermediate digital signal $G1(\alpha)$ are taped, are connected to a first connection point cp1 on a second terminal of the first resistor r1 in the first resistor chain and to a first (dash) connection point cp'1 on a second terminal of the first (dash) resistor r'1 in the second resistor chain, respectively. A second comparator c2, a third comparator c3 and so on up to the I-th comparator cI, from whose outputs further intermediate digital signals $Fi(\alpha)$ and inverted intermediate digital signals $Gi(\alpha)$ are taped, are connected in the same way. Hence each intermediate digital signal $Fi(\alpha)$ results from a comparison of the potential $Pi(\alpha)$ of the first input analogue signal $A+(\alpha)$ at the value $\alpha+\alpha i$ of the observed argument $\alpha$ within the first half-period and with the amplitude reduced according to the resistance ratio of said resistors to the potential $Ni(\alpha)$, which is inverse to the potential $Pi(\alpha)$, of the third input analogue signal $A-(\alpha)$ at the same value $\alpha+\alpha i$ of the observed argument $\alpha$ and with the amplitude reduced according to the resistance ratio of said resistors.

The resistances of the two first resistors r1 and r'1, two second resistors r2 and r'2 and so on up to the two I-th resistors rI and r'I, which are each time equally situated in the respective first and second resistor chain, are determined so that the values $\alpha i$ are uniformly distributed within the first half-period of the observed argument $\alpha$ and that the potential $P(I/2)(\alpha)$ is equal to the signal $B-(\alpha)$ and the potential $P(I)(\alpha)$ equals to the signal $A-(\alpha)$ and the potential $N(I/2)(\alpha)$ equals the signal $B+(\alpha)$ and the potential $N(I)(\alpha)$ equals the signal $A+(\alpha)$ (SI patent 21577).

The invention improves the represented interpolation analogue-to-digital converter by means of a circuit pamc for measuring the peak amplitude of the input signals in the following way.

Each pair of the reference potentials from said selected family (I,m) of potentials, i.e. the potentials $Pi(\alpha)$ and $Ni(\alpha)$, with values of the index $i=m, I/2-m, I/2+m, I-m$, where m is equal to zero or a positive integer, is conducted to a noninverting input of the respective first and second differential amplifiers da'i, da"i in an i-th local circuit lci pertaining to this index i (FIGS. 1 and 2). The output of the first and second differential amplifiers da'i, da"i is connected to a gate terminal of a respective first and second follower transistors t'i, t"i. The sources of the follower transistors t'i, t"i are connected to a common sources terminal csi in the i-th local circuit lci.

The common sources terminals csi of all local circuits lci are connected to a drain terminal of a common load transistor tcal and to a source of a diode-connected transistor tdc. A source of the common load transistor tcal is mass-connected. The drain of the diode-connected transistor tdc, however, is connected to a current source transistor tcs, to an output of the interpolation analogue-to-digital converter iadc for the voltage $U_{env}(\alpha)$ of the waveform envelope of the reference potentials $Pi(\alpha)$ and $Ni(\alpha)$ from the selected family (I,m) of the potentials and to an inverting input of the respective first and second differential amplifiers da'i, da"i pertaining to all said values of the index i.

The transistors t'i, t"i, tcal, tdc, tcs must be NMOS transistors if the voltage $U_{env}(\alpha)$ should represent the upper waveform envelope of the reference potentials $Pi(\alpha)$ and $Ni(\alpha)$.

Said values of the index i at the selected interpolation number I are determined by means of that value of index m, at which the potentials $Pi(\alpha)$ and $Ni(\alpha)$, which belong to the selected family (I,m) of the potentials, have the waveform envelope with the voltage $U_{env}(\alpha)$ having the lowest waviness. This is the value $m=1$ and the values $1, I/2-1, I/2+1, I-1$ are selected as said values of the index i at the selected interpolation number I. It has already been said when disclosing the improved interpolation method that the actual peak amplitude A of the input analogue signals is determined with a high relative accuracy of ±0.029 already at the interpolation number $I=8$.

The improved interpolation circuit operates in the following way as far the determination of the actual peak amplitude of the input signals is concerned. The follower transistors t'i, t"i in the i-th local circuit lci constitute a local follower together with the transistor teal representing their active load. The output voltage CS of the local follower is for the control voltage of the follower transistors t'i, t"i lower than the highest voltage of the reference potentials $Pi(\alpha)$ and $Ni(\alpha)$. Since the voltage $U_{env}(\alpha)$ of the feedback should follow the voltages of the reference potentials $Pi(\alpha)$ and $Ni(\alpha)$ the outer follower is provided with the differential amplifiers da'i, da"i. But also the voltage CS must be raised for the control voltage of the follower transistors t'i, t"i. This is achieved in that the voltage of the diode-connected transistor tdc is added thereto. The voltage $U_{env}(\alpha)$ in the feedback is compared to all reference potentials $Pi(\alpha)$ and $Ni(\alpha)$ in all local circuits lci. The voltage on the transistor tcal, which is the common active load of all follower transistors t'i, t"i, follows the instantaneously highest voltage of the reference potentials $Pi(\alpha)$ and $Ni(\alpha)$ since the transistors are of NMOS type. The one of the follower transistors t'i, t"i, which is controlled by the differential amplifier da'i, da"i having the voltage of one of the reference potentials $Pi(\alpha)$ and $Ni(\alpha)$ lower than the voltage $U_{env}(\alpha)$ on its inverting input, namely closes. Therefore, the voltage $U_{env}(\alpha)$ in the feedback, which is also the voltage at the output of the interpolation analogue-to-digital converter iadc, is the voltage $U_{env}(\alpha)$ of the upper waveform envelope and the represented method as improved by the invention can be carried out by the circuit as improved according to the invention. But the function of the differential amplifiers da'i, da"i is also to raise the level of the input control signal of the follower transistors t'i, t"i and to lower the resistance of the local followers in the common sources terminal csi.

The voltage $U_{env}(\alpha)$ is also present at the output of the interpolation analogue-digital converter iadc when the measuring device is at rest and the sensors are not displaced with regard to the graduated scale. Hence the automatic gain control in the measuring device can also be carried out when the displacement of the sensors with regard to the graduated scale is stopped and no measurement is performed. The improved method and circuit, namely, do not depend on the frequency of the input signals, which may range from zero to several hundred kilohertz.

The invention claimed is:
1. Interpolation method with an interpolation number of I to be carried out in a high-resolution encoder with the input states of said method being defined by a first input analogue signal $A+(\alpha)$, a second input analogue signal $B+(\alpha)$, a third input analogue signal $A-(\alpha)$ and a fourth input analogue signal $B-(\alpha)$,
which signals as cited here one after another are mutually in quadrature,
whereat the functional dependence of the first input analogue signal $A+(\alpha)$ on the observed argument $\alpha$ is $\sin\alpha$, and
which method comprises an interpolation step,
in which intermediate digital signals $Fi(\alpha)$ and inverted intermediate digital signals $Gi(\alpha)$, $i=1, \ldots I$, are generated in that each intermediate digital signal $Fi(\alpha)$ results from a comparison
of a potential $Pi(\alpha)$ of the first input analogue signal $A+(\alpha)$ at the value $\alpha+\alpha i$ of its observed argument $\alpha$ within a first half-period to a potential $Ni(\alpha)$ of the third input analogue signal $A-(\alpha)$ at the same value $\alpha+\alpha i$ of the observed argument $\alpha$, the values $\alpha i$ being uniformly distributed within the first half-period of the observed argument $\alpha$ and the potential $P(I/2)(\alpha)$ being equal to the signal $B-(\alpha)$, the potential $P(I)(\alpha)$ being equal to the signal $A-(\alpha)$, the potential $N(I)2)(\alpha)$ being equal to the signal $B+(\alpha)$ and the potential $N(I)(\alpha)$ being equal to the signal $A+(\alpha)$, and a step of logically combining the intermediate digital signals $Fi(\alpha)$ and $Gi(\alpha)$ in a way that a first output digital signal and a second output digital signal in quadrature thereto are generated, characterized in that a value U of the voltage with respect to zero level of said potentials $Pi(\alpha)$ and $Ni(\alpha)$ is measured at any value of the observed argument $\alpha$, which voltage at that time is the highest one of the voltages at terminals with said potentials $Pi(\alpha)$ and $Ni(\alpha)$ belonging to a family (I,m) of the potentials with values of the index $i=m, I/2-m, I/2+m, I-m$ where m is equal to a positive integer in the range from 1 to $I/2-1$, and that an actual peak amplitude A of the input analogue signals $A+(\alpha), B+(\alpha), A-(\alpha)$ and $B-(\alpha)$ is determined as $$A = k_{I,m} U$$

where the factor $k_{I,m}$ is determined as $$k_{I,m} = \frac{A_o}{\frac{U_{env}^{max} + U_{env}^{min}}{2}}$$

and $U_{env}^{max}$ and $U_{env}^{min}$ are a previously determined highest and lowest value, respectively, of the voltage $U_{env}(\alpha)$ of a waveform envelope of the potentials $Pi(\alpha)$ and $Ni(\alpha)$ from said selected family (I,m) of the potentials at the known value $A_o$ of the peak amplitude of said input analogue signals.

2. Interpolation method as recited in claim 1, characterized in that the highest value $U_{env}^{max}$ and the lowest value $U_{env}^{min}$ of the voltage $U_{env}(\alpha)$ of the waveform envelope of the potentials $Pi(\alpha)$ and $Ni(\alpha)$ from said selected family (I,m) of the potentials at the known value $A_o$ of the peak amplitude of said input analogue signals are calculated and the factor $k_{I,m}$ is calculated.

3. Interpolation method as recited in claim 1, characterized in that the highest value $U_{env}^{max}$ and the lowest value $U_{env}^{max}$ of the voltage $U_{env}(\alpha)$ of the waveform envelope of the potentials $Pi(\alpha)$ and $Ni(\alpha)$ from said selected family (I,m) of the potentials at the known value $A_o$ of the peak amplitude of said input analogue signals are previously measured and the factor $k_{I,m}$ is calculated.

4. Interpolation method as recited in claim 1, characterized in that a value $U_p$ of the voltage $U_{env}(\alpha)$ of the waveform envelope of the potentials $Pi(\alpha)$ and $Ni(\alpha)$ from said selected family (I,m) of the potentials at some value of the observed argument $\alpha$ at the known value $A_o$ of the peak amplitude of said input analogue signals is previously measured and the factor $$k_{I,m} = \frac{A_o}{U_p}$$

is calculated.

5. Interpolation method as recited in claim 2, characterized in that the value U of the voltage, which at that time is the highest one of the voltages at the terminals with the potentials $Pi(\alpha)$ and $Ni(\alpha)$ from that selected family (I,m) of the potentials, is measured, the waveform envelope with the voltage $U_{env}(\alpha)$ of the potentials of which family has a lowest waviness $$\frac{\Delta}{U_{env}^{max}}$$

with $\Delta = U_{env}^{max} - U_{env}^{min}$.

6. Interpolation method as recited in claim 5, characterized in that the potentials from the family (I,1) of the potentials are used for measuring the value U.

7. Interpolation method as recited in claim 1, characterized in that the interpolation number is I=8.

8. Interpolation circuit with an interpolation number of I provided to be used in a high-resolution encoder and in which a first output digital signal and a second output digital signal in quadrature thereto are prepared by logically combining intermediate digital signals $Fi(\alpha)$ and inverted intermediate digital signals $Gi(\alpha), i=1, \ldots I$, which are generated in an interpolation analogue-to-digital converter (iadc), which comprises a first resistor chain of a first resistor (r1), a second resistor (r2) and so on up to an I-th resistor (rI), which are series-connected to each other, and a second resistor chain of a first dash resistor (r'1), a second dash resistor (r'2) and so on up to an I-th dash resistor (r'I), which are series-connected to each other, and in which the first and the first dash resistors (r1, r'1) and the second and the second dash resistors (r2, r'2) and so on up to the I-th and the I-th dash resistors (rI, r'I) each time equally situated in the respective first and second resistor chain have the same resistance and in which the first input analogue signal $A+(\alpha)$ is conducted to a first terminal of the first resistor (r1) at the beginning of the first chain and in which the third input analogue signal $A-(\alpha)$ is conducted to a second terminal of the I-th resistor (rI) at the end of the first chain and in which the third input analogue signal $A-(\alpha)$ is conducted to a first terminal of the first dash resistor (r'1) at the beginning of the second chain and in which the first input analogue signal $A+(\alpha)$ is conducted to a second terminal of the I-th dash resistor (r'I) at the end of the second chain and in which the fourth input analogue signal $B-(\alpha)$ is conducted to a second terminal of the $$\frac{I}{2}\text{-th}$$

resistor $$\left(r\frac{I}{2}\right)$$

in the first chain and in which the second input analogue signal B+(α) is conducted to a second terminal of the $$\frac{I}{2}\text{-th}$$

dash resistor $$\left(r'\frac{I}{2}\right)$$

in the second chain,
whereat the first input analogue signal A+(α), the second input analogue signal B+(α), the third input analogue signal A−(α) and the fourth input analogue signal B−(α) as cited here one after another are mutually in quadrature and the functional dependence of the first input analogue signal A+(α) on the observed argument α is sin α, and in which inputs of a first comparator (c1), from whose outputs the first intermediate digital signal F1(α) and the first inverted intermediate digital signal G1(α) are taped, are connected to a second terminal of the first resistor (r1) in the first chain and to a second terminal of the first dash resistor (r'1) in the second chain, respectively, and a second comparator (c2), a third comparator (c3) and so on up to the I-th comparator (cI) are connected in the same way, at an output of which comparators further intermediate digital signals Fi(α) and inverted intermediate digital signals Gi(α) are taped, whereat each intermediate digital signals Fi(α) results from a comparison of the potential Pi(α) of the first input analogue signal A+(α) at the value α+αi of its observed argument α within a first half-period and with an amplitude determined by the resistance ratio of said resistors to a potential Ni(α), which is inverse to the potential Pi(α), of the third input analogue signal A−(α) at the same value α+αi of the observed argument α and with an amplitude determined by the resistance ratio of said resistors, and in which the resistances of the first and the first dash resistors (r1, r'1), the second and the second dash resistors (r2, r'2) and so on up to the I-th and the I-th dash resistors (rI, r'I) each time equally situated in the respective first and second chain are determined so that the values αi are uniformly distributed within the first half-period of the observed argument α and the potential P(I/2)(α) is equal to the signal B−(α), the potential P(I)(α) is equal to the signal A−(α), the potential N(I/2)(α) is equal to the signal B+(α) and the potential N(I)(α) is equal to the signal A+(α), characterized in that each pair of the potentials Pi(α) and Ni(α) with values of the index i=m, I/2−m, I/2+m, I−m where m is equal to a positive integer in the range from 1 to I/2−1, is conducted to a noninverting input of a respective first and second differential amplifier (da'i, da"i) pertaining to this index i, whose output is connected to a gate terminal of a respective first and second follower transistor (t'i, t"i), whose sources are connected to a common sources terminal (csi), and that said common sources terminals (csi) for all said values of the index i are connected to a drain terminal of a load transistor (tcal), whose source is mass-connected, and to a source of a diode-connected transistor (tdc), whose drain is connected to a current source transistor (tcs), to an output for the voltage $U_{env}(α)$ of the waveform envelope of the potentials Pi(α) and Ni(α) from the selected family (I,m) of the potentials and to an inverting input of the respective first and second differential amplifier (da'i, da"i) for all said values of the index i.

9. Interpolation circuit as recited in claim 8, characterized in that said values of the index i at the selected interpolation number I are determined by means of that value of the index m, at which the potentials Pi(α) and Ni(α) from the selected family (I,m) of the potentials have the waveform envelope with the voltage $U_{env}(α)$ having a lowest waviness.

10. Interpolation circuit as recited in claim 9, characterized in that the values 1, I/2−1, I/2+1, I−1 are selected as said values of the index i at the selected interpolation number I.

11. Interpolation circuit as recited in claim 9, characterized in that the interpolation number is I=8.

12. Interpolation circuit as recited in claim 9, characterized in that the transistors (t'i, t"i, tcal, tdc, tcs) are NMOS transistors.

* * * * *